(12) United States Patent
Suita (10) Patent No.: US 7,766,522 B2
(45) Date of Patent: Aug. 3, 2010

(54) HEADLIGHT DEVICE FOR VEHICLE

(75) Inventor: Yoshikazu Suita, Samutprakarn (TH)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 243 days.

(21) Appl. No.: 12/029,411

(22) Filed: Feb. 11, 2008

(65) Prior Publication Data

US 2008/0192498 A1      Aug. 14, 2008

(30) Foreign Application Priority Data

Feb. 13, 2007    (JP) ............................. 2007-031899

(51) Int. Cl.
*B62J 6/00* (2006.01)
*B60Q 1/00* (2006.01)

(52) U.S. Cl. ................. 362/475; 362/507; 362/514; 362/516; 362/473; 362/476

(58) Field of Classification Search ................. 362/507, 362/527, 538, 473, 475, 476, 514, 516
See application file for complete search history.

(56) References Cited

U.S. PATENT DOCUMENTS

| 3,546,445 | A | * | 12/1970 | Marchant et al. ............ 362/396 |
| 3,939,339 | A | * | 2/1976 | Alphen ....................... 362/467 |
| 4,686,656 | A | * | 8/1987 | Morishima .................. 362/473 |
| 4,979,077 | A | * | 12/1990 | Philipp-Buterowe et al. ..... 362/518 |
| 5,906,431 | A | * | 5/1999 | Chianale et al. ............. 362/515 |

FOREIGN PATENT DOCUMENTS

JP          07-073705          3/1995

* cited by examiner

*Primary Examiner*—Stephen F Husar
*Assistant Examiner*—James W Cranson
(74) *Attorney, Agent, or Firm*—Keating & Bennett, LLP (57) ABSTRACT

A headlight device for a vehicle that improves external appearance by varying irradiation light reflected by a reflector. The reflector is in a shape of a bowl opening to a front side of the vehicle. An outer housing supports the reflector so that the reflector can swing back and forth. A ring member formed separately from the outer housing covers an opening edge of the reflector.

13 Claims, 11 Drawing Sheets

HEADLIGHT DEVICE FOR VEHICLE

RELATED APPLICATIONS

This application claims the benefit of priority under 35 USC 119 of Japanese patent application no. 2007-031899, filed on Feb. 13, 2007, which application is hereby incorporated by reference in its entirety.

BACKGROUND OF THE INVENTION

1. Field of the Invention

The invention relates to a headlight device for a vehicle, and more particularly to a headlight device having a reflector that is supported by an outer housing and can swing back and forth.

2. Description of Related Art

JP-A-H7-73705 discloses a headlight device having a substantially bowl-shaped reflector for reflecting light irradiated from a lamp bulb forward, a lamp body supporting the reflector so that the reflector can swing back and forth, and a lens mounted to an opening of the lamp body to cover a front side of the reflector.

A headlight device such as that described by JP-A-H7-73705 has a diminished external appearance because light irradiated from the lamp bulb is leaked and spreads outward from an opening edge of the reflector.

SUMMARY OF THE INVENTION

The invention provides a headlight device wherein irradiation light reflected by the reflector is variable to improve the external appearance of the device.

A headlight device according to the invention comprises a bulb as a source of irradiation light. A bowl-shaped reflector opening toward a front side of the vehicle on a back side of the bulb reflects the irradiation light in a predetermined direction. An outer housing supports the reflector. A lens is supported on the outer housing and covers a front side of the reflector. A ring member formed separately from the outer housing covers an opening edge of the reflector.

In accordance with the invention, a ring member formed separately from an outer housing covers an opening edge of a reflector. Accordingly, the ring member prevents irradiation light from a bulb from leaking outside through the opening edge of the reflector. This results in a clear outline of the irradiation light along a shape of the opening edge of the reflector and variable external appearance, so that the design is improved.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiments of the invention are now described with reference to the attached drawings. FIGS. 1-11 illustrate a headlight device for a vehicle in accordance with an embodiment of the invention. In the following description, back-and-forth and right-and-left directions are from the perspective of a rider sitting on a seat.

Figure 1:
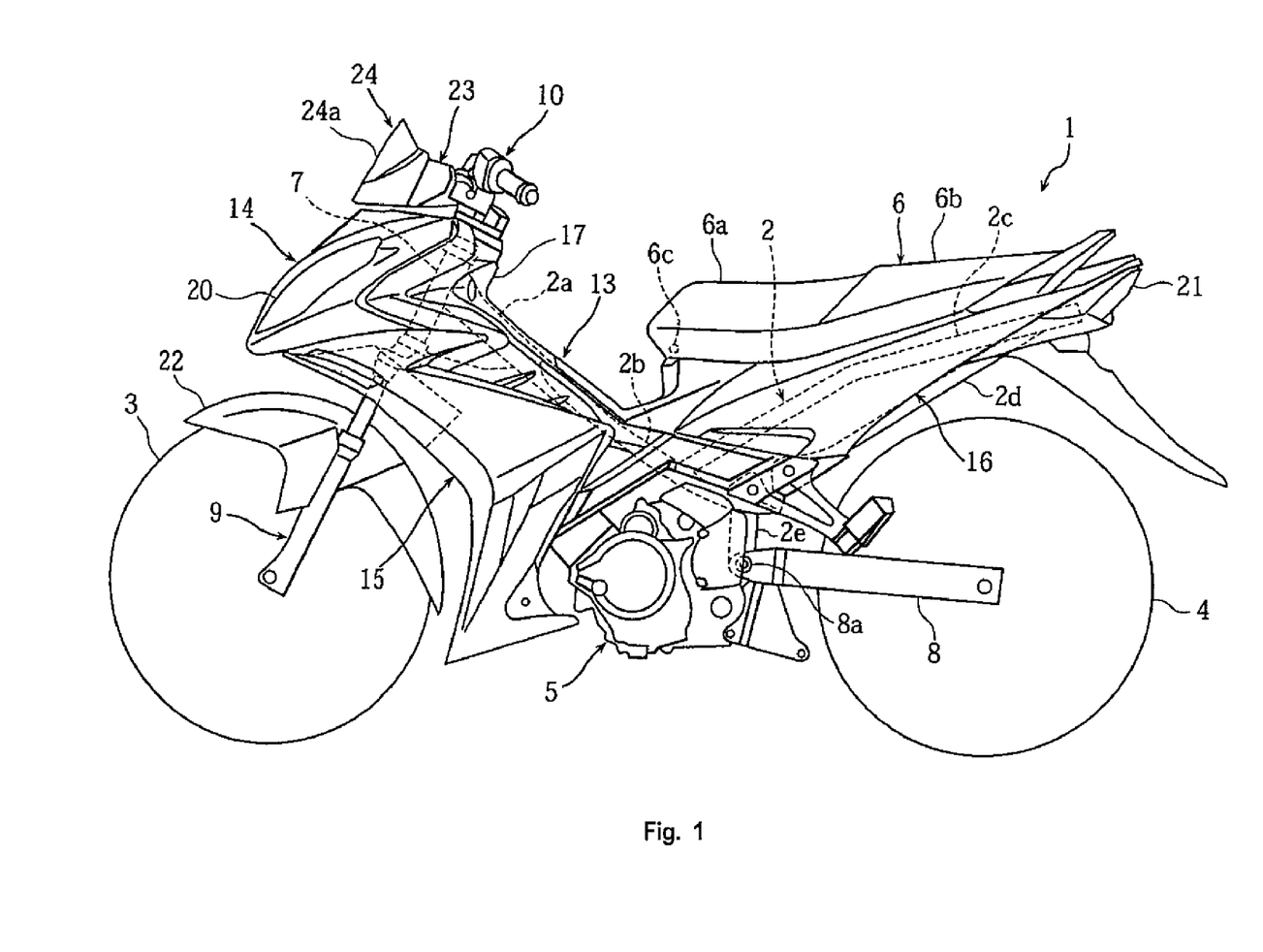
FIG. 1 is a side view of a motorcycle having a headlight device in accordance with an embodiment of the invention.

In the drawings, 1 denotes a motorcycle. Motorcycle 1 comprises a front wheel 3 provided at a front end of an under-bone type body frame 2 and a rear wheel 4 provided at a rear end part of body frame 2. An engine 5 is mounted under body frame 2 and a straddle-type seat 6 is provided above body frame 2.

Body frame 2 includes main frame 2a, right and left downtubes 2b, right and left seat rails 2c and right and left seat stays 2d. Main frame 2a extends obliquely downward and rearward from a head pipe 7 at a front end of body frame 2. Down tubes 2b continue from main frame 2a to open outward in the vehicle width direction and extend obliquely downward and rearward. Seat rails 2c extend from rear ends of down tubes 2b obliquely upward and rearward. Seat stays 2d connect rear end parts of seat rails 2c with rear end parts of down tubes 2b.

Body frame 2 also includes a rear arm bracket 2e connected to rear ends of down tubes 2b to extend downward. A rear arm 8 is supported on rear arm bracket 2e through a pivot shaft 8a to be vertically swingable. Rear wheel 4 is pivotally supported on a rear end of rear arm 8.

A front fork 9 is pivotally supported on head pipe 7 and can be steered right and left. Front wheel 3 is pivotally supported on a lower end part of front fork 9 and a steering handle 10 is fixed to an upper end of front fork 9. A meter device 23 having a speed meter, a fuel residue meter, a signal lamp and the like is provided on a front side of steering handle 10. A meter cover 24 covering a front side of meter device 23 has a visor 24a formed for guiding running wind to the upper side of a rider to ease wind pressure.

Seat 6 is mounted on seat rail 2c and includes a main seat 6a on which a rider sits formed into one body with a tandem seat 6b on which a tandem rider sits. Seat 6 is rotatable up and down about a front hinge part 6c. A battery, a fuel tank, a storage box and such are provided under seat 6.

Engine 5 is a water-cooled four-cycle engine and is suspended and supported on right and left down tubes 2b. Revolution force of engine 5 is transmitted to rear wheel 4 through a power transmitting member such as a chain.

Body frame 2 is covered with a body cover 13. Body cover 13 includes a front cover 14 for covering a front side part of head pipe 7, an inner cover 17 for covering a rear part of head pipe 7, a leg shield 15 for covering a front side of a rider's leg and a side cover 16 for covering a circumference of a part on the lower side of seat 6.

Front cover 14 is provided with a headlight device 20, while a tail light device is provided at a rear end of side cover 16. A number plate on which light from tail light device 21 is irradiated is provided under tail light device 21.

Figure 2:
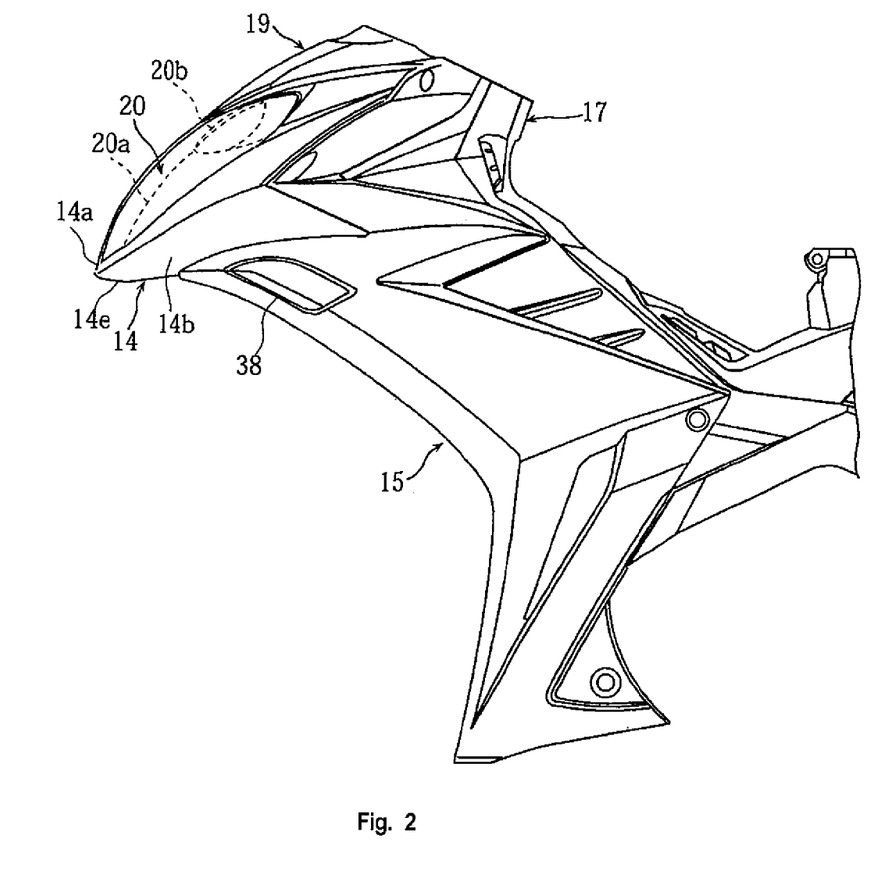
FIG. 2 is a side view of a front cover of the headlight device.
Figure 3:
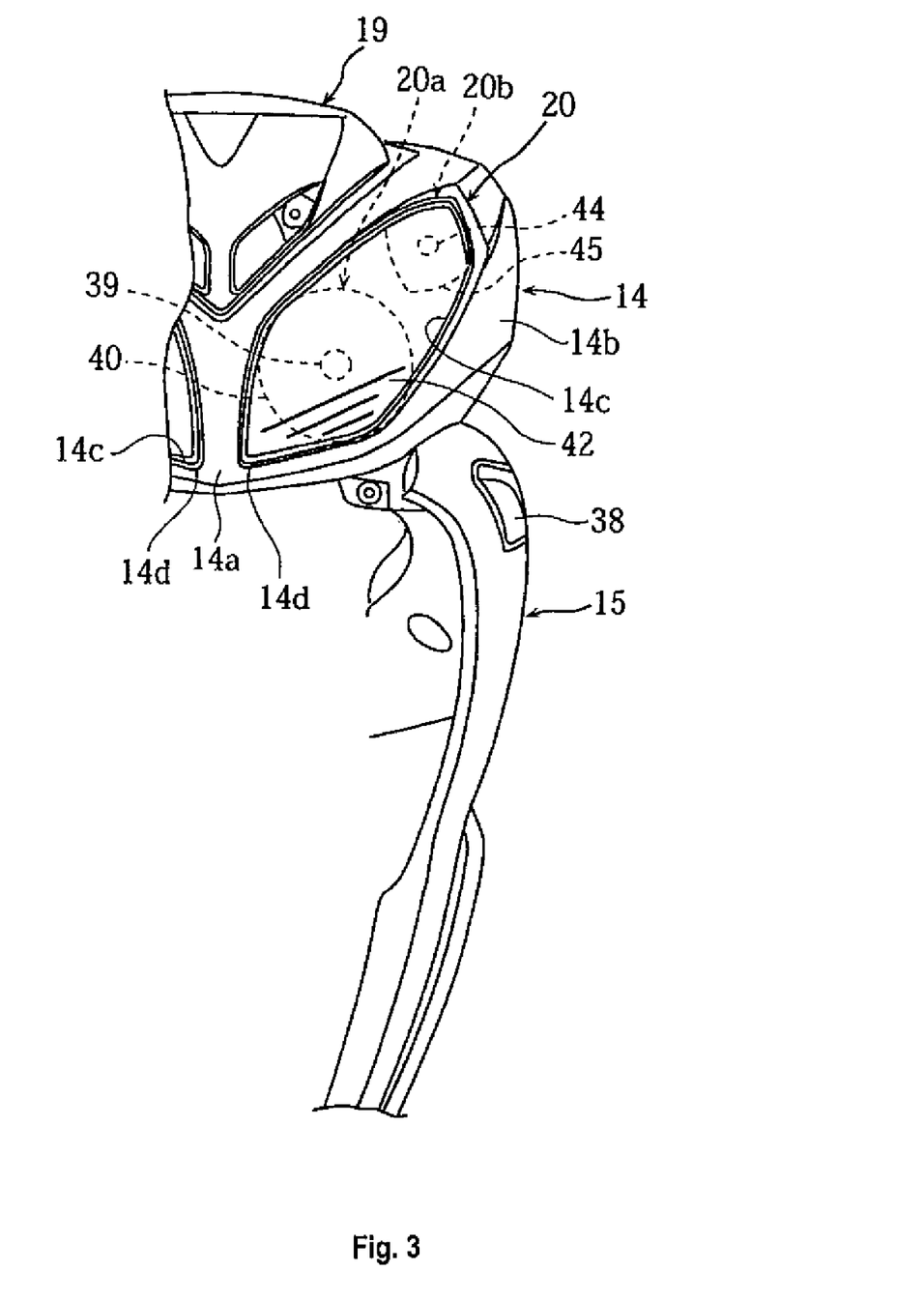
FIG. 3 is a front view of the front cover.

Front cover 14 includes an upper cover part 14a extending obliquely downward toward the front side, right and left lower cover parts 14b continued from a lower edge of upper cover part 14a to extend obliquely downward and rearward, and a bottom part 14e extending rearward from a front edge of upper cover part 14a. Front cover 14 is formed into a roughly V shape in side view. A substantially triangular front molding 19 is detachably mounted to upper cover part 14a.

Right and left light openings 14c are formed in upper cover part 14a. Front edges 14d of light openings 14c are close to each other and light openings 14c extend obliquely upward and outward in the width direction in the shape of a rough oval from front edge 14d, in a front view. Light openings 14c are large and spread substantially all over upper cover 14a.

Figure 4:
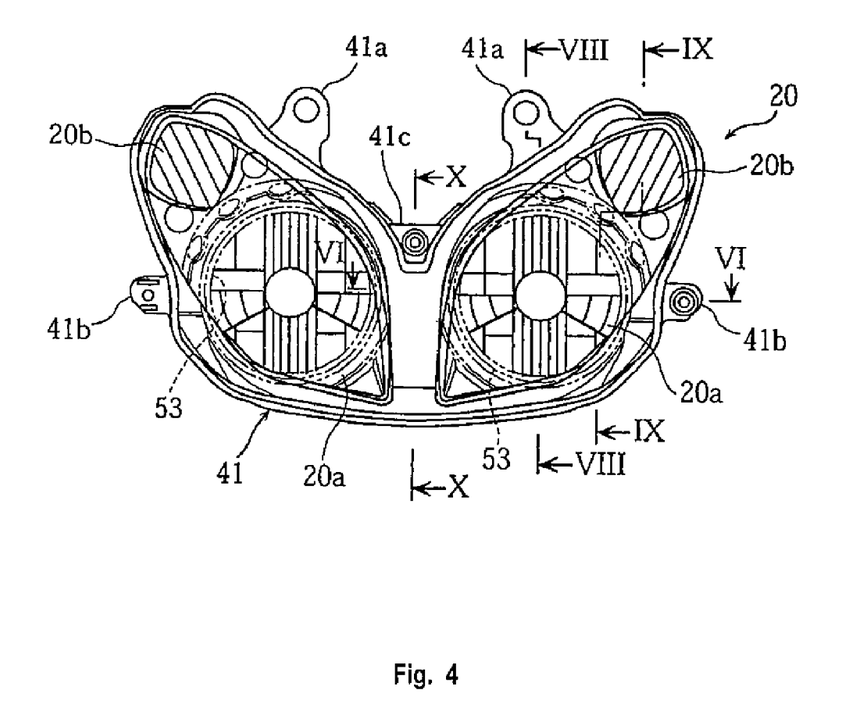
FIG. 4 is a front view of the headlight device.
Figure 5:
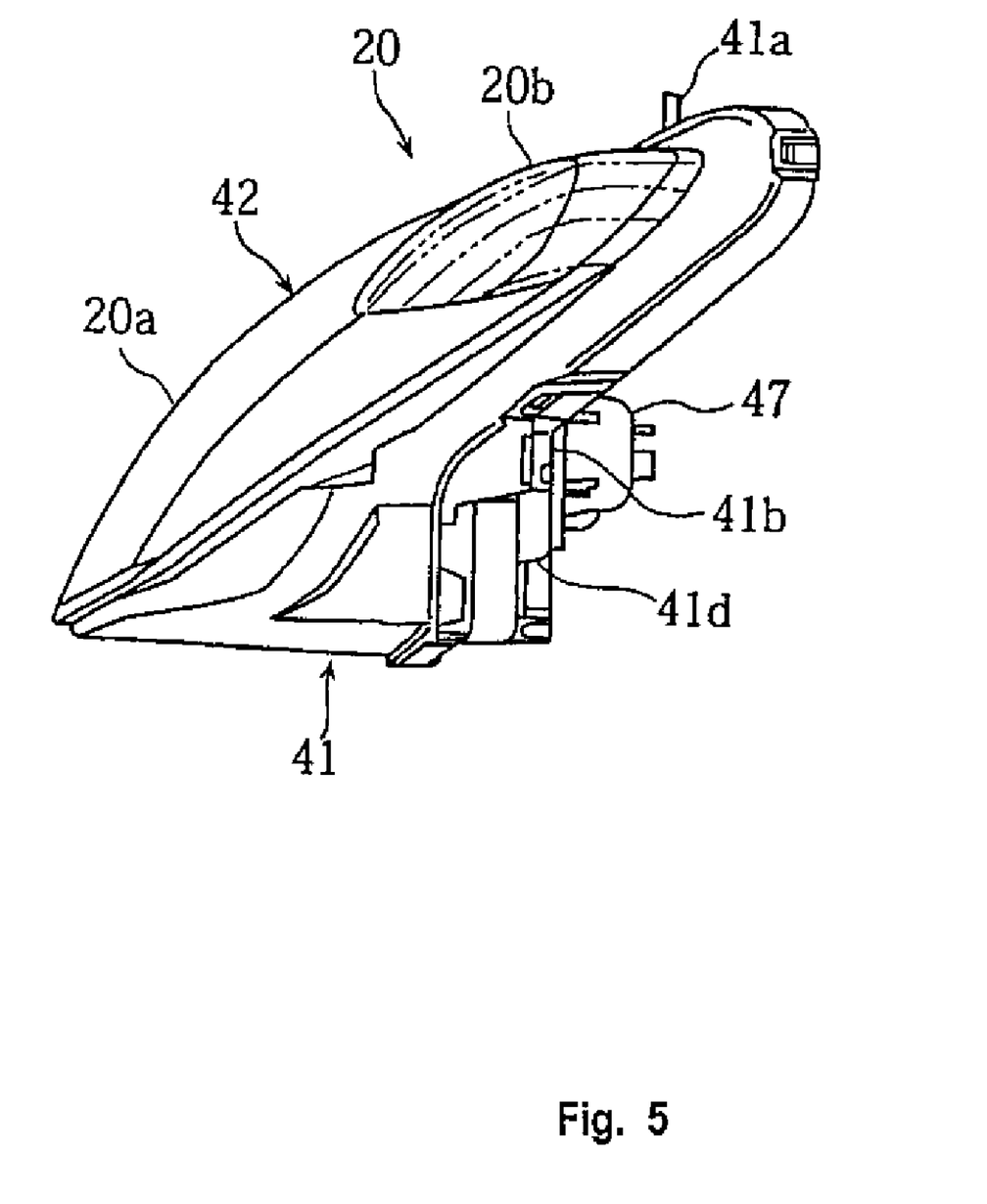
FIG. 5 is a side view of the headlight device.

A headlight device 20 is provided in each light opening 14c. Headlight device 20 comprises right and left headlights 20a provided in parallel in the vehicle width direction and formed into one body with right and left winker lights 20b provided on an upper-rear side of headlights 20a. Right and left position lights 38 are provided under headlights 20a in an upper end part of leg shield 15.

Figure 6:
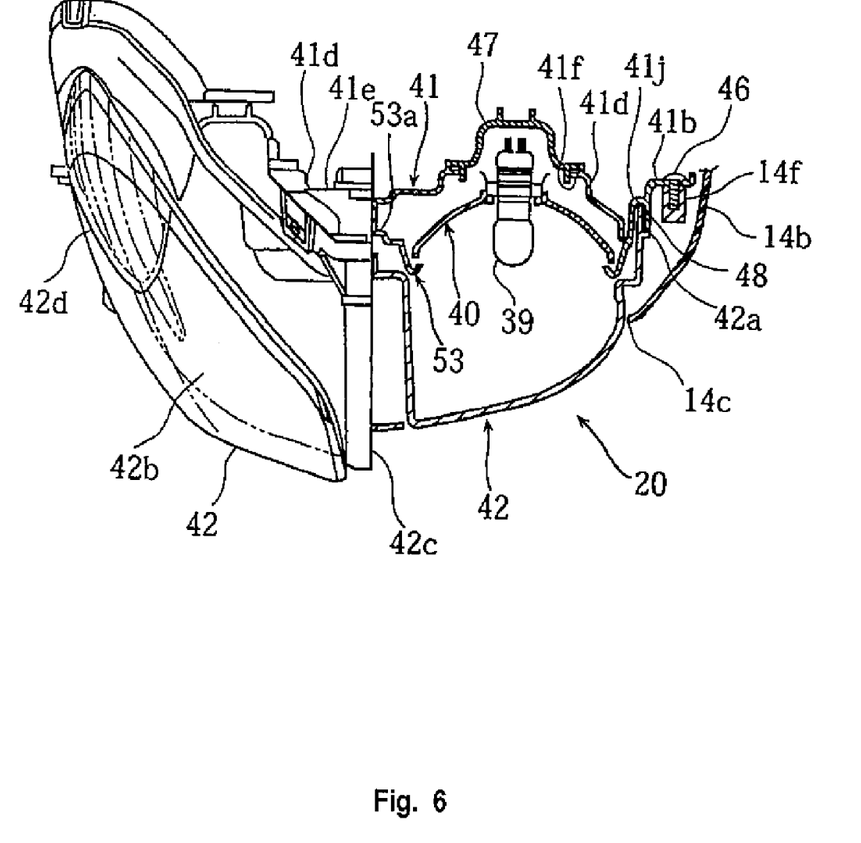
FIG. 6 is a flat view of the head light device with a partial sectional view taken through line VI-VI of FIG. 4.

Headlights 20a comprise bulbs 39 as a source of irradiation light, reflectors 40 on the back side of bulbs 39 for reflecting the irradiation light toward the front side of motorcycle 1, an outer housing 41 supporting reflector 40 and a lens 42 supported on housing 41 and covering the front side of reflector 40 (FIG. 6).

Figure 9:
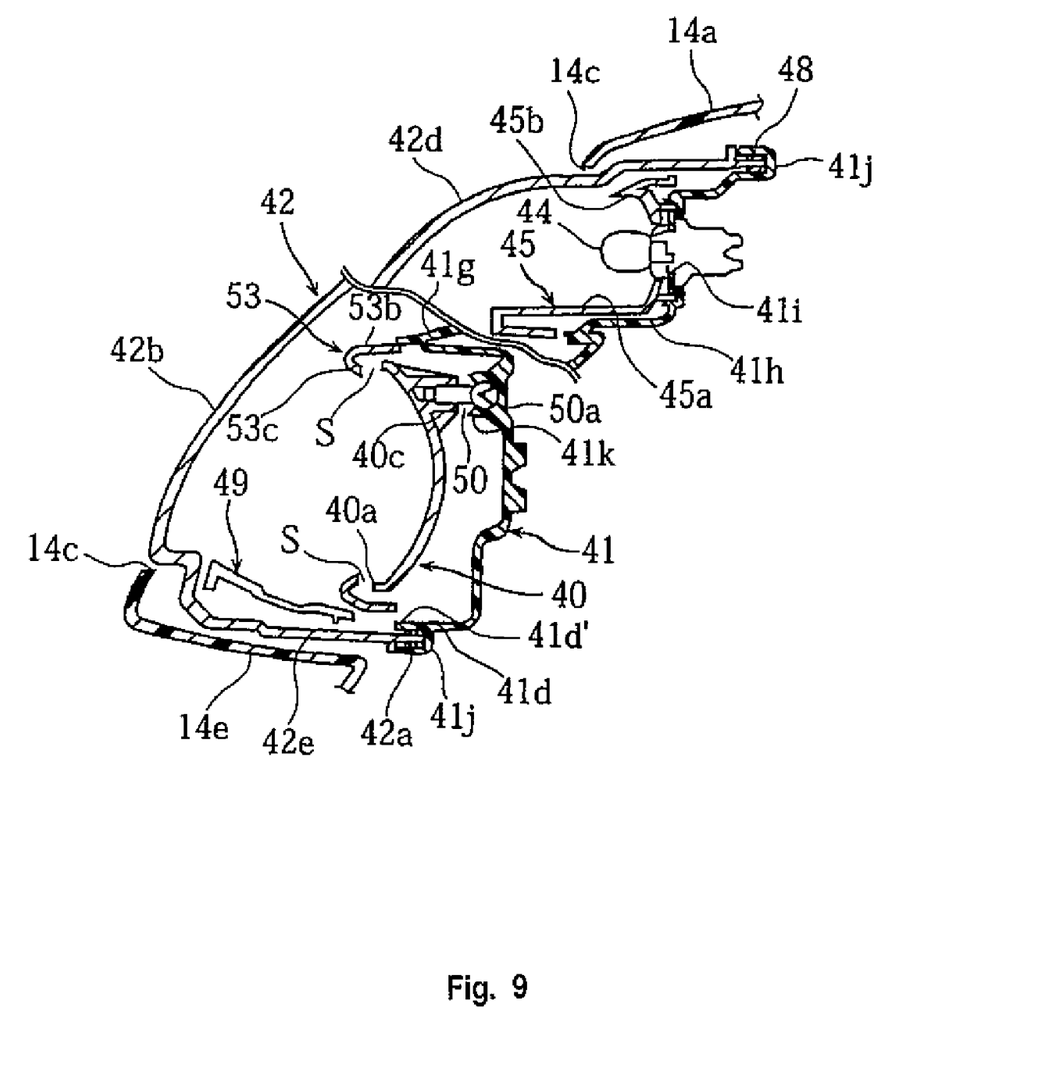
FIG. 9 is a sectional view of the headlight device taken through line XI-XI of FIG. 4.

Winker lights 20b comprise winker bulbs 44 as a light source, winker reflectors 45 for reflecting light irradiated from winker bulbs 44 toward the front side of motorcycle 1, housing 41 used in common with headlight 20a for supporting winker reflectors 45 and lenses 42 used in common with headlight 20a and covering the front side of reflector 45 (FIG. 9).

Figure 7:
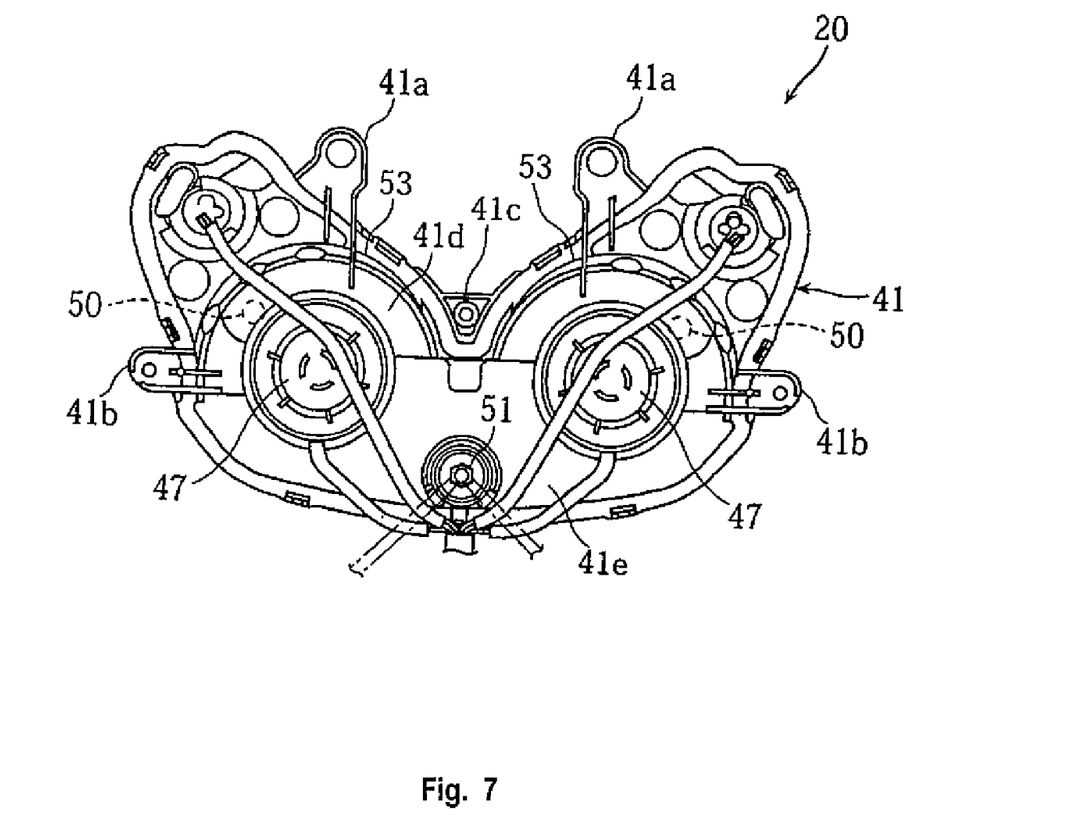
FIG. 7 is a rear view of the headlight device.
Figure 8:
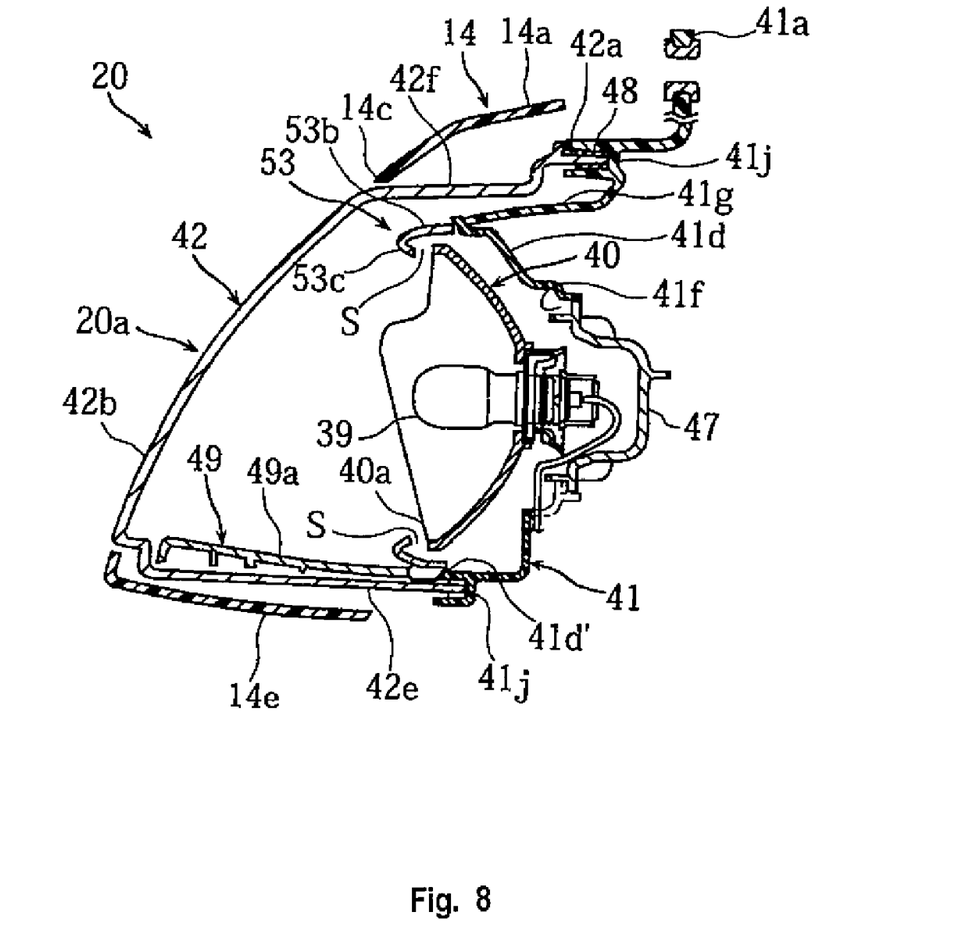
FIG. 8 is a sectional view of the headlight device taken through line VIII-VIII of FIG. 4.
Figure 10:
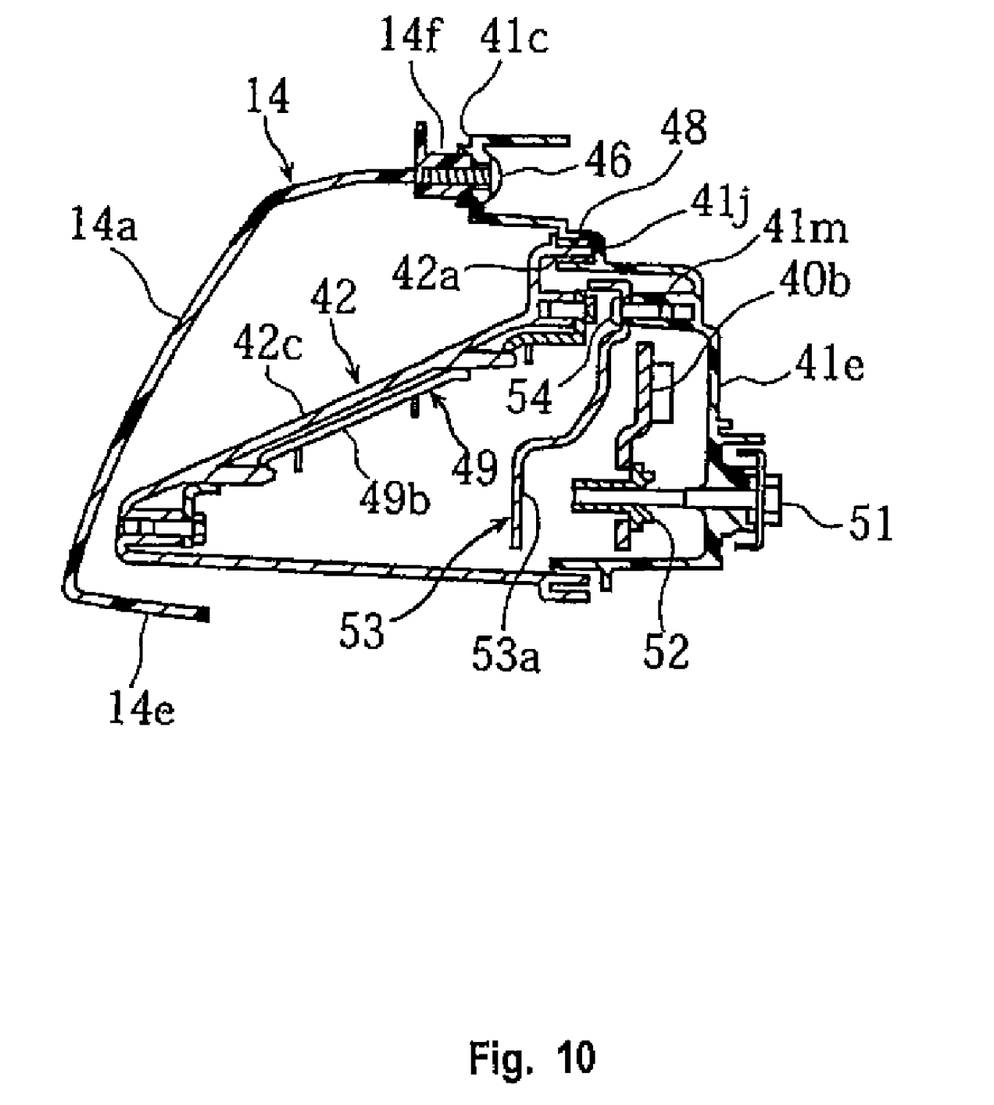
FIG. 10 is a sectional view of the headlight device taken through line X-X of FIG. 4.
Figure 11:
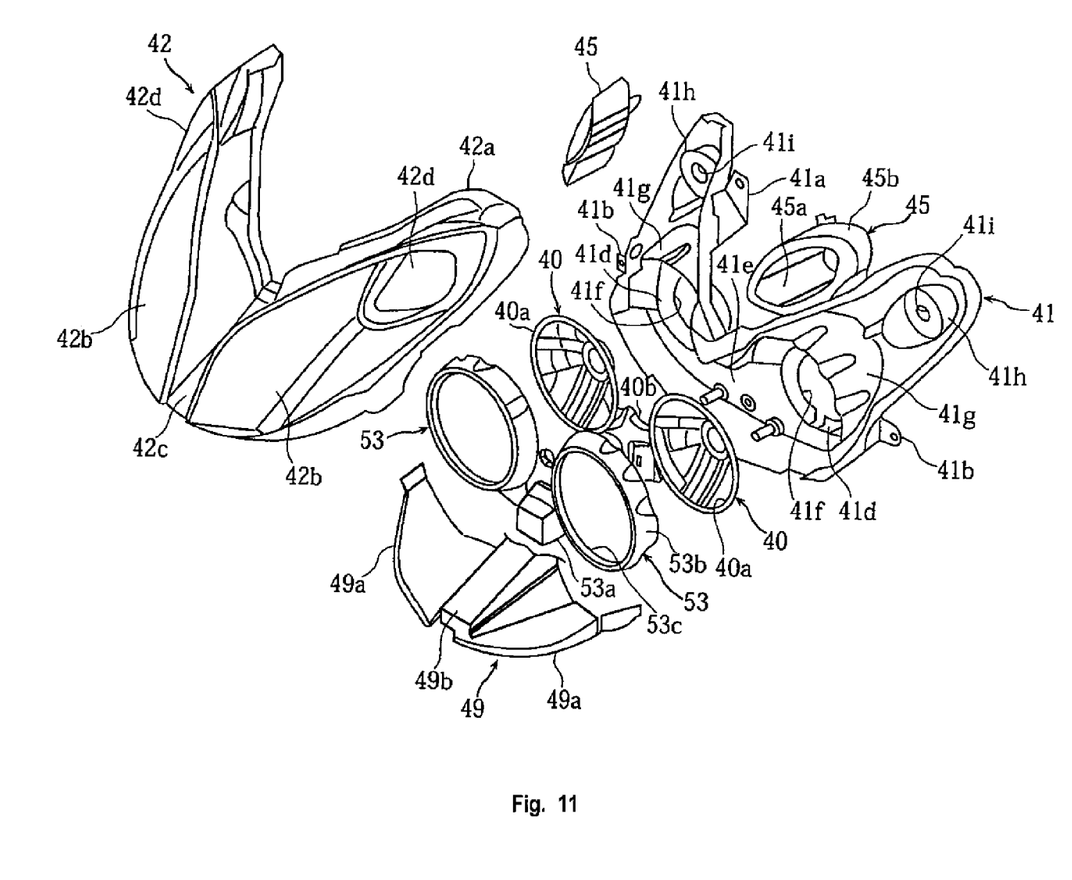
FIG. 11 is an exploded perspective and disassembled view of the headlight device.

Housing 41 comprises right and left longitudinal mount pieces 41a and lateral mount pieces 41b, and a center mount piece 41c (FIG. 7). Housing 41 is fixed to front cover 14 by connecting mount pieces 41a, 41b and 41c to a boss 14f of front cover 14 through a screw member 46 (FIGS. 6, 8 and 10).

Housing 41 also includes substantially bowl-shaped right and left reflector cylinder parts 41d that surround reflectors 40 from the rear side, and a connection part 41e in the shape of a longitudinal wall connecting reflector cylinder parts 41d into one body. Bulb attaching holes 41f open rearward in bottom parts of cylinder parts 41d. A lid member 47 is detachably mounted to bulb attaching hole 41f.

Light shielding parts 41g are formed on and extend rearward from upper edges of reflector cylinder parts 41d to prevent leakage of light irradiated from bulb 39 into the winker light 20b side. Light-shielding part 41g may be formed into one body with or separately from the housing. Light-shielding part 41g may also be formed into one body with a ring member 53.

Housing 41 has right and left winker cylinder parts 41h that continue and extend rearward from reflector cylinder parts 41d to roughly surround winker reflectors 45 from the rear side. Bulb mounting holes 41i open rearward in bottom parts of winker cylinder parts 41h.

Winker reflectors 45 are substantially in the shape of a cylinder. A bottom wall 45a of winker reflectors 45 extends further frontward than a ceiling wall 45b. Winker reflectors 45 are fitted and fixed to winker cylinder parts 41h.

Reflectors 40 are substantially in the shape of a bowl opening frontward. An opening edge 40a of reflector 40 is in the shape of a right circle in a front view. Bulb 39 is detachably mounted to the bottom part of reflector 40 from the rear side. Opening edges 40a of reflectors 40 and opening edges 41d' of reflector cylinder parts 41d substantially accord in position in the back-and-forth direction (FIGS. 8 and 9). Reflectors 40 are connected into one body by a longitudinal wall-shaped connection part 40b.

An outer peripheral part 42a of lens 42 is mounted in a groove 41 formed in the outer periphery of housing 41 via a seal member 48 to support lens 42 on housing 41. Lens 42 includes right and left reflector lens parts 42b that surround opening edges 40a of reflectors 40 from an outer circumferential side, right and left winker lens parts 42d that extend rearward and obliquely upward from reflector lens parts 42b to surround the opening edges of winker reflectors 45 from the outer circumferential side, and a connection part 42c that connects reflector lens parts 42b into one body.

Reflector lens parts 42b and winker lens parts 42d are in the shape of a rough oval extending obliquely upward and outward in the vehicle width direction along light openings 14c. Winker bulb 44 is provided in an upper corner part of winker lens 42d.

Connection part 42c is stepped down from reflector lens parts 42b and inclines forward so that its front side is lower than the rear side. Connection part 42c is covered with upper cover part 14a of front cover 14 (refer to FIGS. 10 and 11).

Reflector lens parts 42b are curved obliquely downward to the front side so that bottom wall parts 42e extend further forward than ceiling wall parts 42f (FIG. 8).

Bottom walls 42e of reflector lens parts 42b are provided with a light-shielding member 49 for preventing leakage of irradiation light from bulb 39 through bottom walls 42e. Light-shielding member 49 includes left and right light-shielding parts 49a covering bottom walls 42e and connected into one body by a connection part 49b. Connection part 49b is formed along connection part 42c of lens 42 to be positioned and fixed to connection part 42c (FIG. 10).

Reflectors 40 are supported on housing 41 to be swingable back and forth. Boss parts 40c are formed in upper edge parts of reflectors 40 on the outer side in the vehicle width direction. Swing shafts 50 having pivot parts 50a are inserted into and fixed to boss parts 40c. Pivot parts 50a are swingably supported on swing support parts 41k formed in reflector cylinder parts 41d (FIG. 9).

An aiming bolt 51 is inserted from the back side into a lower part of connection part 41e of housing 41 at the center in the vehicle width direction. Aiming bolt 51 is screwed into a nut 52 fixed to connection part 40b of reflectors 40 (FIGS. 7 and 10). Rotating aiming bolt 51 right and left causes reflectors 40 to swing back and forth around pivot parts 50a together with bulb 39. This allows optical axis adjustment of headlights 20a to be carried out all together.

Reflectors 40 are provided with ring members 53 formed separately from housing 41, that is, formed from components different from those of housing 41. Ring members 53 cover opening edges 40a of reflectors 40 from the front side and are connected into one body by a connection part 53a in the shape of a longitudinal wall.

Connection part 53a is fixed to a boss part 41m projecting forward from connection part 41e of housing 41 by a screw member 54 screwed from the front side (FIG. 10) to support ring members 53 on housing 41.

Ring members 53 include cylinder parts 53b covering opening edges 40a of reflectors 40 from the outer circumferential side and curved peripheral parts 53c formed from front edges of cylinder parts 53b and bent inward. Rear edges of cylinder part 53b are interlocked with front edge parts of reflector cylinder parts 41d to form a substantially continuous surface.

Curved peripheral part 53c is bent toward the inner side of opening edge 40a of reflector 40. The inner diameter of curved peripheral part 53c is less than that of opening edge 40a of reflector 40. Accordingly, ring member 53 encloses opening edge 40a from the outer circumferential side to the inner circumferential side in a front view.

Gaps S between opening edges 40a of reflectors 40 and cylinder parts 53b and curved peripheral parts 53c of ring members 53 correspond to the range of movement of reflectors 40 during a back-and-forth swing. Opening edges 40a thus do not interfere with ring members 53 even when reflectors 40 are moved back and forth through their full range of movement.

In accordance with the embodiment, opening edges 40a of reflectors 40 are covered from the front side with ring members 53 formed separately from housing 41. Accordingly, ring member 53 prevents leakage of irradiation light from bulb 39 through opening edge 40a of reflector 40. This results in a clear outline of irradiation light along opening edge 40a of reflector 40, so that the external appearance of the irradiation light can be variable, and thereby, the appearance of the headlight is improved. Light irradiated from headlights 20a is substantially in the shape of a column or a shell in appearance.

In the embodiment, ring member 53 includes cylinder part 53b covering the outer circumference of opening edge 40a of reflector 40 and curved peripheral part 53c covering the inner circumference of opening edge 40a by bending a front peripheral part of cylinder part 53b inward. Accordingly, opening edge 40a of reflector 40 is enclosed from the outer to the inner circumferential side, so that leakage of irradiation light through opening edge 40a is surely prevented. This further clarifies the outline of the irradiation light.

The inner diameter of curved peripheral part 53c of ring member 53 is less than that of opening edge 40a of reflector 40 in the embodiment. Leakage of irradiation light through opening edge 40a is thereby more certainly prevented.

In the embodiment, bottom wall 42e of lens 42 extends further forward than the lower edge of reflector 40 and is provided with light-shielding member 49. Accordingly, irradiation light is prevented from penetrating bottom wall 42e to be scattered downward, and the outline of irradiation light is further clarified.

In the embodiment, a gap S corresponding to the range of movement during a back-and-forth swing of reflector 40 is provided between opening edge 40a of reflector 40 and ring member 53. Accordingly, reflector 40 does not interfere with ring member 53 in aiming, so that optical axis adjustment can be carried out without any obstacle.

In the embodiment, headlight device 20 is a dual type in which winker lights 20b are arranged on the outer and rear sides of headlights 20a. External appearance is thereby improved.

Further, opening edges 40a of reflectors 40 are covered with ring members 53 for headlights 20a. Accordingly, irradiation light does not leak outside through opening edges 40a, so that the outline of irradiation light along the shape of the reflectors is made clear. The appearance of double light headlights 20a is thereby improved.

In the embodiment, reflector lens parts 42b include winker lens parts 42d, which extend obliquely upward and outward in the vehicle width direction and are in the shape of a rough oval. Winker bulbs 44 are provided in the upper corner parts of winker lens parts 42d. Accordingly, irradiation light from bulbs 39 of headlights 20a is prevented from being irradiated toward winker lights 20b. Difficulty in observing light from winker bulbs 44 due to light from a headlight 20a side is thus prevented.

A headlight device for a motorcycle has been described. The headlight device of the invention, however, is applicable to other vehicles such as automobiles.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A headlight device for a vehicle comprising:
    a bulb as a source of irradiation light;
    a bowl shaped reflector opening toward a front side of the vehicle on a back side of the bulb and arranged to reflect the irradiation light in a predetermined direction;
    an outer housing supporting the reflector;
    a lens supported on the outer housing and covering a front side of the reflector; and
    a ring member separate from the outer housing and covering an opening edge of the reflector; wherein
    the ring member is arranged within an interior space of the headlight defined between the lens and the outer housing.

2. The headlight device according to claim 1, wherein the ring member includes a cylinder part covering the opening edge of the reflector from an outer circumferential side and a curved peripheral part formed at a front edge of the cylinder part and bent inward.

3. The headlight device according to claim 2, wherein an inner diameter of the curved peripheral part of the ring member is less than an inner diameter of an opening of the reflector.

4. The headlight device according to claim 1, wherein a bottom wall of the lens extends further forward than a ceiling wall of the lens from the ring member, and a light-shielding member is provided on the bottom wall to prevent the irradiation light from passing outside of the bottom wall.

5. The headlight device according to claim 1, wherein a swing support part arranged to support the reflector to be swingable back and forth together with the bulb is positioned between an upper edge part of the reflector and the outer housing, and a gap corresponding to a range of movement of a back-and-forth swing of the reflector is provided between the opening edge of the reflector and a peripheral part of a rearward facing opening of the ring member.

6. The headlight device according to claim 1, further comprising:
    right and left reflectors connected into one body by a connection part and supporting right and left bulbs;
    right and left reflector cylinder parts arranged in the outer housing and connected into one body by a connection part to surround the right and left reflectors from the rear side;
    right and left reflector lens parts connected by a connection part into one body and surrounding openings of the right and left reflectors from the outer circumferential side; and
    right and left ring members connected into one body by a connection part and enclosing opening edges of the right and left reflectors, wherein the connection part of the right and left ring members is fixed to the connection part of the outer housing.

7. The headlight device according to claim 6, wherein
    the right and left reflector lens parts are substantially in a shape of an oval extending obliquely upward and outward in a vehicle width direction; and
    winker bulbs for indicating a direction are provided in upper corners of the reflector lens parts.

8. A motorcycle comprising the headlight device of claim 1.

9. A headlight device for a vehicle comprising:
a bulb as a source of irradiation light;
a bowl shaped reflector opening toward a front side of the vehicle on a back side of the bulb arranged to reflect the irradiation light in a predetermined direction;
an outer housing supporting the reflector;
a lens supported on the outer housing and covering a front side of the reflector; and
a ring member separate from the outer housing and covering an opening edge of the reflector; wherein
the ring member includes a cylinder part covering the opening edge of the reflector from an outer circumferential side and a curved peripheral part located at a front edge of the cylinder part and bent inward; and
an inner diameter of the curved peripheral part of the ring member is less than an inner diameter of an opening of the reflector.

10. A headlight device for a vehicle comprising:
a bulb as a source of irradiation light;
a bowl shaped reflector opening toward a front side of the vehicle on a back side of the bulb arranged to reflect the irradiation light in a predetermined direction;
an outer housing supporting the reflector;
a lens supported on the outer housing and covering a front side of the reflector; and
a ring member separate from the outer housing and covering an opening edge of the reflector; wherein
a bottom wall of the lens extends from the ring member to a point further forward than a ceiling wall of the lens, and a light-shielding member is provided on the bottom wall to prevent the irradiation light from passing outside of the bottom wall.

11. A headlight device for a vehicle comprising:
a bulb as a source of irradiation light;
a bowl shaped reflector opening toward a front side of the vehicle on a back side of the bulb arranged to reflect the irradiation light in a predetermined direction;
an outer housing supporting the reflector;
a lens supported on the outer housing and covering a front side of the reflector; and
a ring member separate from the outer housing and covering an opening edge of the reflector; wherein
a swing support part arranged to support the reflector to be swingable back and forth together with the bulb is positioned between an upper edge part of the reflector and the outer housing, and a gap corresponding to a range of movement of a back-and-forth swing of the reflector is provided between the opening edge of the reflector and a peripheral part of a rearward facing opening of the ring member.

12. A headlight device for a vehicle comprising:
a bulb as a source of irradiation light;
a bowl shaped reflector opening toward a front side of the vehicle on a back side of the bulb arranged to reflect the irradiation light in a predetermined direction;
an outer housing supporting the reflector;
a lens supported on the outer housing and covering a front side of the reflector;
a ring member separate from the outer housing and covering an opening edge of the reflector;
right and left reflectors connected into one body by a connection part and supporting right and left bulbs;
right and left reflector cylinder parts arranged in the outer housing and connected into one body by a connection part to surround the right and left reflectors from the rear side;
right and left reflector lens parts connected by a connection part into one body and surrounding openings of the right and left reflectors from the outer circumferential side; and
right and left ring members connected into one body by a connection part and enclosing opening edges of the right and left reflectors, wherein the connection part of the right and left ring members is fixed to the connection part of the outer housing.

13. The headlight device according to claim 12, wherein the right and left reflector lens parts are substantially in a shape of an oval extending obliquely upward and outward in a vehicle width direction; and
winker bulbs for indicating a direction are provided in upper corners of the reflector lens parts.

* * * * *